United States Patent [19]

Doemen

[11] 4,097,789
[45] Jun. 27, 1978

[54] ROTATION-SUPERVISED D-C FAN OR BLOWER SYSTEM

[75] Inventor: Benno Doemen, St. Georgen, Germany

[73] Assignee: Papst-Motoren KG, St. Georgen, Germany

[21] Appl. No.: 678,361

[22] Filed: Apr. 19, 1976

[30] Foreign Application Priority Data

Apr. 26, 1975 Switzerland .................. 5351/75

[51] Int. Cl.² .................................. H02H 7/08
[52] U.S. Cl. .................................. 318/461; 318/331
[58] Field of Search ............... 318/318, 331, 461, 462, 318/463, 464; 307/129, 120; 340/419, 253 Y, 240 B, 249 C, 248 E, 271; 317/13 R; 361/30, 31; 310/490

[56] References Cited

U.S. PATENT DOCUMENTS

| | | | |
|---|---|---|---|
| 2,989,678 | 6/1961 | Swartout | 318/461 |
| 3,079,523 | 2/1963 | Thienlf | 318/318 |
| 3,149,243 | 9/1964 | Garfield | 340/253 Y |
| 3,617,836 | 11/1971 | Henry | 317/13 R |
| 3,705,337 | 12/1972 | Grabl | 318/331 |
| 3,809,975 | 5/1974 | Bartels | 318/139 |
| 3,868,521 | 2/1975 | Schlicker | 310/257 |

*Primary Examiner*—David Smith, Jr.
*Attorney, Agent, or Firm*—Flynn & Frishauf

[57] ABSTRACT

An evaluation circuit, sensitive of the frequency of an applied signal, is connected to the motor to sense the a-c component of the pulsating current flow through the motor, the evaluation circuit preferably including a filter matched to the frequency of the a-c component at operating speed to enhance the a-c component at operating speed or speed range with respect to other frequencies. The signal is taken across an impedance element connected in series with the motor and motor supply circuit, which may be a transformer or a low-value resistor, to provide an output voltage signal of a magnitude sufficient to unambiguously control a transistor amplifier, for example in the order of 0.1 V.

11 Claims, 4 Drawing Figures

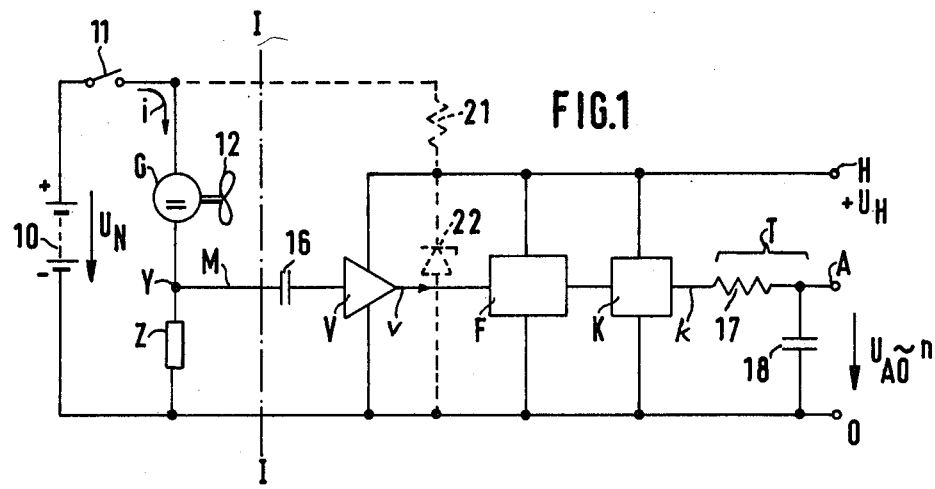
FIG.1
FIG.1A
FIG.2
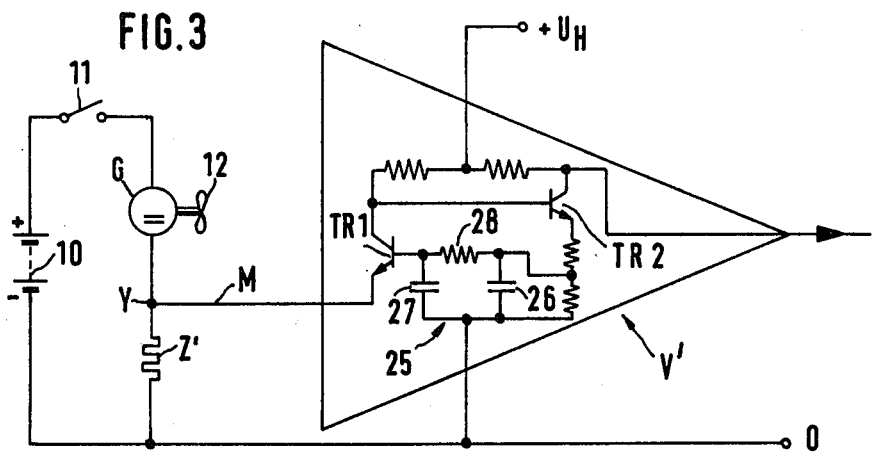
FIG.3

ROTATION-SUPERVISED D-C FAN OR BLOWER SYSTEM

The present invention relates to a fan or blower system in which the operating speed of the fan or blower (hereinafter for simplicity: ventilator) is supervised, the ventilator being driven by a d-c motor, the supply current of which pulses synchronously with motor rotation.

Ventilators of the type to which the invention especially relates are supplied by a supply current which pulses for example between zero and a maximum value, pulsation being synchronous with rotor rotation. Such ventilators are used extensively in connection with computers, computer terminals, communication systems and apparatus, and the like, in order to provide forced air ventilation and protect the apparatus against overheating. If, for some reason or other, such a ventilator does not operate properly or even stalls or stops entirely, damage to the associated equipment may result.

It has previously been proposed - see for example U.S. Pat. Nos. 3,742,267 and 3,868,521 — to associate a tachogenerator with such ventilators which has an output voltage having a frequency and/or amplitude proportional to speed in order to supervise operation of the ventilator. Such supervisory apparatus, however, requires substantial equipment and hence increases expense and requires the installation of additional components demanding space in the equipment.

It is an object of the present invention to provide an inexpensive and reliable ventilator system which is monitored with respect to operation and which is driven by a d-c motor and without need to change the design.

Subject matter of the present invention: Briefly, the a-c component of the pulsating supply current is applied to an evaluation circuit which provides an output signal dependent on the frequency of the a-c component of the pulsating supply current. The output signal can then be utilized to generate an alarm, to connect a stand-by ventilator, or to disconnect the equipment which is no longer subjected to forced ventilation.

It has been found that a ventilator driven by a motor disclosed, for example, in U.S. Pat. Nos. 3,873,897 or 3,840,761, is particularly suitable, since such motors may have a relatively highly pulsating current when operated from a d-c source. Another motor of this type is shown, for example, in German Publication Document DT-AS No. 2,346,380.

In operation, the stator of these motors provides only an alternating electromagnetic field; since the drive torque generated by the alternating field has gaps, an additional auxiliary reluctance torque is provided during the gaps of energization of the stator. Such motors are inexpensive, simple and yet very effective for many applications and are readily adapted for use in the system of this invention.

In accordance with a feature of the invention, the motor and its direct current supply source are connected. in series with an impedance element. The a-c voltage component across the impedance element, which has a frequency proportional to operating speed of the ventilator, is applied over an amplifier to a band pass filter and then to a monostable flip-flop (FF), the output of which is connected to a timing or integrating circuit forming an average value and smoothing the waveiness of the output of the FF. The output of the timing or integrating circuit forms the output of the evaluation circuit, providing an output signal which is proportional to speed. This signal, preferably, is in the form of a d-c signal which can then be utilized to generate the required alarm, or stop-motion signal, for example by energizing a relay (which may be mechanical or electronic) as desired, or to otherwise generate a monitoring or supervisory output signal.

The impedance element in series with the ventilator motor may be a resistor or an inductance. Use of the primary winding of a transformer as the impedance element has the advantage that the evaluation circuit is galvanically isolated from the ventilator motor and the direct current supply source. The transformer, however, is more expensive than a resistor.

The invention will be illustrated specifically with respect to a compact axial-flow fan combined with a drive motor. The overall system, that is, the supervised ventilator system, does not - practically - require additional space beyond that of the fan or ventilator structure itself. The impedance element can be located immediately adjacent the centrally located drive motor, for example, if the motor is an external rotor-motor, at the holding flange thereof or anywhere in the lead, the latter demonstrating the unlimited applicability of the invention at any already produced ventilator.

The invention will be described by way of example with reference to the accompanying drawings, wherein:

FIG. 1 is a highly schematic circuit diagram, partly in block form, of a ventilator system in accordance with the present invention, in which current and voltage relations are also indicated;

FIG. 1a is a fragmentary circuit diagram of another embodiment of the system of FIG. 1;

FIG. 2 is a schematic diagram of the portion of the evaluation circuit which transforms the output signal to a supervisory function; and FIG. 3 is a more detailed circuit diagram of an element in the system of FIG. 1 illustrating a preferred embodiment thereof.

The broken line I—I in FIG. 1 illustrates the separating line between the monitoring electronic portion of the system of the present invention and the ventilator itself. Only two connections are ordinarily needed from the ventilator portion of the system to the electronic portions, indicated by lines O, which may be a common ground or chassis connection, and M.

A battery 10, for example of nominal voltage $U_N$ of 24 V, is connected through a switch 11 to an axial-flow ventilator motor G, to which ventilator blades 12 are mechanically connected, as schematically indicated in FIG. 1. The motor G is connected to a junction point Y and in series through an impedance Z to the return conductor O of the battery 10. The impedance element Z between the junction Y and the ground, or chassis common connection O may be a resistor, or an inductive element such as a choke. Referring to the embodiment of FIG. 1A, it may also be the primary winding 13 of a transformer 14. Transformer 14 has a secondary 15. The secondary can be galvanically isolated from the primary, as shown in FIG. 1A, which is a fragmentary diagram of the impedance portion of FIG. 1.

Referring again to FIG. 1: Junction Y is connected over line M to a coupling capacitor 16 which couples the a-c component across impedance Z to an amplifier V. The amplifier amplifies the a-c component and applies it through its output $v$ to a band pass filter F. If motor G is a two-pole permanent magnet motor, having a speed range of about 2400 to 4800 rpm, then the frequency of band pass F should be somewhat between 40 and 80 Hz. Limiting the band pass of frequencies of the output from amplifier V decreases the effect of stray or noise influences. The motor current $i$ (FIG. 1), in operation of the motor G, will have an a-c component therein changing synchronously with rotation of the rotor of motor G. Such an a-c component will also appear across the impedance Z, and hence the frequency of this a-c component is a direct measure for the instantaneous speed of the motor.

Band pass filter F is connected to a monostable flip-flop (FF) K, the pulse duration of which is matched to the nominal speed of the fan to be supervised. A suitable pulse duration is, for example, 50% of the cycling duration of the frequency - at nominal speed - to be supervised. An average value is generated by the FF K, proportional to the applied frequency, and hence exactly proportional to the speed of the ventilator 12.

The output signal at terminal K from FF K is connected to an integrator T formed by a resistor 17 and a capacitor 18. The effect of the integrator is to form an average, smooth output signal which appears at the output terminals O and A as a d-c voltage signal $U_{AO}$, proportional to speed of the ventilator. The output of the signal $U_{AO}$ can be suitably selected by choice or matching of the R and C elements in the integrator T as well as of the pulse duration, and/or amplitude of the output from FF K.

A regulated auxiliary voltage $U_H$ is utilized to supply operating power to the amplifier V, filter F and FF K. Such a voltage is usually available in equipment of the type with which the ventilator is ordinarily associated. If not so available, however, it can be readily derived by connecting a resistor 21, as indicated in broken lines, to the switch 11, that is, by energizing the resistor 21 when the motor is energized, and stabilizing the output voltage by means of a Zener diode 22. This stabilized supply power source is not a necessary feature of the present invention and, hence, shown in broken lines; in most cases the electronic apparatus with which the ventilators are associated, or in which the ventilators are assembled, will have regulated voltages available and can be directly applied to the electronic monitoring portion of the system of the present invention.

If it is desired to completely galvanically separate the motor G from the supervisory or monitoring portion, then the embodiment of FIG. 1A is suitable. Transformer 14 has separate, isolated primary and secondary windings 13, 15. The secondary winding 15 can be directly connected to the amplifier V, since the transformer 14 will transmit only the a-c components of the voltages across its primary winding. The remainder of the circuit of FIG. 1A is identical, and the respective terminal connections have been given the same reference numerals, as in FIG. 1.

The output signal derived from the integrator T, which is an average value representative of speed, can be used to effect various supervisory, monitoring, control, or other switching functions. FIG. 2 illustrates application of the output voltage $U_{AO}$ to a control circuit W which includes a Schmitt trigger S. The trigger circuit S is an operational amplifier, the threshold level of which is set by the voltage across the tap point of a voltage divider connected across the regulated supply voltage derived from terminal H and the common connection O. The output from integrator T, at terminal A, is connected to the inverting input of the operational amplifier, which has resistive feedback. When a critical minimum speed is passed, as the ventilator 12 decelerates, for example, the circuit W will respond and cause relay 23 to drop out, thus disconnecting power to a supervised load 24, for example a computer. The relay 23 can be constructed to be normally open, or normally closed; for fail-safe operation, it should preferably be constructed to drop out upon failure of either supply voltage, or ventilator operation.

Other monitoring supervisory or control functions can be obtained; the a-c signal may be evaluated in various ways. For example, the charge-discharge curve of a capacitor can be used directly as a comparison criterion, for example when a certain predetermined voltage charge level is passed.

A particularly suitable amplifier V is shown in FIG. 3. The amplifier V' is simple and has high amplification characteristics, while being extremely reliable. A first transistor TR1 has its emitter directly connected through line M to junction Y, that is, between the motor G and the impedance element Z, shown as a resistor Z'. The full signal across the impedance element Z' then is available to the transistor TR1. Unambiguous, for example square-wave signals, are obtained by high amplification in the amplifier V'. Amplifier V' is temperature-stabilized by means of a feedback circuit which includes the filter 25. Filter 25 has two capacitors 26, 27 and a series resistor 28 therebetween, connected as shown in FIG. 3. Filter 25 feeds back, essentially, the d-c component of the signal on transistor TR2 to the base of transistor TR1. The base of transistor TR2 is connected directly to the collector of transistor TR1. The amplification of amplifier V' can be made frequency-dependent by suitable choice of the parameters or values of the elements of the filter 25, so that the amplifier V' can act, at least in part, as the band pass filter F. By suitable choice of the capacity value of capacitors 26, 27, it is possible to influence or change the filter characteristics of the amplifier V'.

The emitter of transistor TR1 is connected directly with junction Y, so that high amplification is obtained. In an example, a nominal supply voltage $U_N$ of 24 volts was used; the fan motor G had a d-c resistance of 27 ohms. The impedance element Z was selected to be a resistor Z' of about 0.5 ohm. The current through the motor varied between 0.2 to 0.5 A.

Even at low motor current, for example 0.2 A, the voltage drop across resistor Z' will be 0.1 V. Such a low voltage drop is highly important since apparatus or devices which are driven, for example, by batteries use energy which is substantially more expensive than electrical energy derived from power mains. Losses within the overall system should, therefore, be held to a low value, and as low as possible. A voltage drop of 0.1 V, with respect to a nominal supply voltage of 24 V, results in only a minor percentage loss of overall power, so the efficiency of the overall system is still high. The circuit of FIG. 3 permits efficient utilization of supply voltage by the ventilator; additionally, it provides for quite effective isolation between the network which includes the auxiliary voltage $U_H$ and the network including the power supply for the ventilator, that is, the battery 10.

Various changes and modifications may be made, and features described in connection with any one of the embodiments may be used with any one of the others, within the scope of the inventive concept. The invention is particularly applicable to DC-motors with a few phases only (U.S.-Pat. No. 3,873,897 f.i. relates to a "one-phase motor" - i.e. one winding-) which means few stator windings or in case of a DC-motor with brushes: a low number of commutator sections.

I claim:

1. Rotation-supervised d-c fan, blower, or ventilator system having a brushless d-c motor (G) arranged for connection to a source of d-c (10) providing intermittent, pulsed power to said motor to operate said motor at a predetermined speed, or within a predetermined speed range, current flow (i) through the motor (G) being in pulses undulating between upper and lower values, whereby the current through the motor will have an a-c component, said system comprising an impedance element (Z) connected in series with the motor (G);

an a-c responsive evaluation circuit (K, T) sensitive to the frequency of an applied signal, said evaluation circuit being connected across said impedance element and sensing the voltage drop of the a-c component of the pulsating current flow through the motor;

an a-c amplifier (V, V') connected across the impedance element (Z), and applying the a-c component of the voltage drop across the impedance element (Z) to the evaluation circuit (K, T);

and a band pass filter means (F) connected to the evaluation circuit (K, T) and to the motor and matched to the frequency of the a-c component at said operating speed, or range, to enhance said a-c component at said speed, or range, with respect to other frequencies at other speeds;

the evaluation circuit (K, T) providing an output signal ($U_{AO}$) if the frequency of the sensed a-c component of the pulsating current flow through the motor drops below a predetermined level.

2. System according to claim 1, wherein the impedance element is a low-value resistor.

3. System according to claim 2, wherein said resistor is in the order of about 0.5 ohm.

4. System according to claim 1, wherein said impedance element comprises a transformer.

5. System according to claim 1, wherein the amplifier (V') is at least a two-stage amplifier, and includes a first amplification transistor (TR1) having its emitter connected directly to the junction point (Y) of the impedance element (Z) and the motor, and a second amplification transistor (TR2), the collector of the first transistor (TR1) being connected directly to the base of the second transistor (TR2).

6. System according to claim 5, wherein said amplifier includes said filter means, said amplifier having a frequency-dependent feedback connection (25) between the output of the second transistor (TR2) and the input of the first transistor (TR1) and having a preferred band pass width matched to the frequency of said a-c component when the ventilator is operating at or above a predetermined minimum speed.

7. System according to claim 1, wherein the evaluation circuit includes a monostable flip-flop (K) and an integrator (T) connected to the output of the monostable flip-flop (K).

8. System according to claim 1, further comprising a control circuit (W) connected to and controlled by the output signal ($U_{AO}$) of the evaluation circuit (K, T), said control circuit including a Schmitt trigger (S).

9. System according to claim 1, wherein the impedance element (Z') is a resistor having a value matched to the supply voltage and operating current of the ventilator to result in a d-c voltage drop thereacross which, in operation, is in the order of approximately 0.1 V.

10. System according to claim 6, wherein the impedance element (Z') is a resistor having a value matched to the supply voltage and operating current of the ventilator to result in a d-c voltage drop thereacross which, in operation, is in the order of approximately 0.1 V.

the evaluation circuit includes a monostable flip-flop (K) and an integrator (T) connected to and controlled by the monostable flip-flop (K);

and a control circuit (W) is provided, connected to the output of the integrator (T), said control circuit including a Schmitt trigger (S).

11. System according to claim 1, further comprising a band pass filter (F) connected to the a-c amplifier (V, V') and applying the enhanced a-c component of the voltage drop across the impedance element (Z) thereto.

* * * * *